US011474983B2

(12) United States Patent
Pulipaty et al.

(10) Patent No.: US 11,474,983 B2
(45) Date of Patent: Oct. 18, 2022

(54) ENTITY RESOLUTION OF MASTER DATA USING QUALIFIED RELATIONSHIP SCORE

(71) Applicant: International Business Machines Corporation, Armonk, NY (US)

(72) Inventors: Geetha Sravanthi Pulipaty, Bangalore (IN); Chitra A Iyer, Bangalore (IN); Prabhakaran Ramalingam, Bangalore (IN); Shettigar Parkala Srinivas, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 16/927,258

(22) Filed: Jul. 13, 2020

(65) Prior Publication Data

US 2022/0012219 A1    Jan. 13, 2022

(51) Int. Cl.
*G06F 16/215* (2019.01)
*G06F 16/28* (2019.01)
*G06N 20/00* (2019.01)

(52) U.S. Cl.
CPC ......... *G06F 16/215* (2019.01); *G06F 16/288* (2019.01); *G06N 20/00* (2019.01)

(58) Field of Classification Search
USPC ....................................................... 707/692
See application file for complete search history.

(56) References Cited

U.S. PATENT DOCUMENTS 8,250,008 B1    8/2012  Cao
8,250,065 B1 *  8/2012  Chambers ............. G06F 16/954
                                                   707/723

(Continued)

FOREIGN PATENT DOCUMENTS

CN    106575395 A    4/2017
CN    104317801 B    7/2017
CN    108920601 B    12/2020

OTHER PUBLICATIONS

Bremer et al, "Machine Learning Applied to the Clerical Task Management Problem in Master Data Management Systems", 13 pps., Lecture Notes In Informatics (LNI), Gesellschaft für Informatik, Bonn 2019, <https://btw.informatik.uni-rostock.de/download/tagungsband/C6-1.pdf>.

(Continued)

*Primary Examiner* — Cam Linh T Nguyen
(74) *Attorney, Agent, or Firm* — David Mattheis; Maeve M. Carpenter

(57) ABSTRACT

A first score associated with matching between entity records of a plurality of entities of master data of an MDM system is received. A set of entity records with a first score above a lower threshold score and below an upper threshold score is identified as unresolved; neither confirmed as matched or unmatched. A second score associated with relationships between entity records is generated. Overall scores for pairs of the set of entity records are determined by combining the first matching score with the second relationship score. The overall score of respective pairs of the set of entities is compared to the upper threshold, and if the upper threshold is exceeded, then the information of the pair of entity records of the set of entity records are combined into a single record, and redundant entity records are removed from the MDM system.

20 Claims, 4 Drawing Sheets

(56) References Cited

U.S. PATENT DOCUMENTS

| | | |
|---|---|---|
| 8,965,848 B2 | 2/2015 | Caceres |
| 9,690,816 B2 | 6/2017 | Dozier |
| 9,727,842 B2 | 8/2017 | Caceres |
| 10,268,735 B1 | 4/2019 | White |
| 2002/0073138 A1* | 6/2002 | Gilbert .................. G16H 10/60 709/201 |
| 2011/0047167 A1 | 2/2011 | Caceres |
| 2017/0278043 A1 | 9/2017 | Dow |
| 2018/0113928 A1* | 4/2018 | Oberhofer ............. G06F 16/215 |
| 2018/0329911 A1 | 11/2018 | Slinker |
| 2019/0114354 A1 | 4/2019 | Orun |
| 2019/0362271 A1 | 11/2019 | Kambadahalli Puttasetty |
| 2020/0287914 A1* | 9/2020 | Swanson ............... G06F 21/554 |
| 2021/0090694 A1* | 3/2021 | Colley .................. G16B 40/00 |

OTHER PUBLICATIONS

Kochar et al., "Applying Machine Learning to Data Stewardship", Aug. 13, 2019, 5 pps., <https://medium.com/inside-machine-learning/applying-machine-learning-to-data-stewardship-d3ff9f4874e1>.
Search Report and Written opinion from International Application No. PCT/CN2021/104769 filed Jul. 6, 2021.

\* cited by examiner

ENTITY RESOLUTION OF MASTER DATA USING QUALIFIED RELATIONSHIP SCORE

FIELD OF THE INVENTION

The present invention relates generally to the field of master data management, and more particularly to improving the resolution of entity data in master data management systems using a qualified relationship score.

BACKGROUND OF THE INVENTION

Master data management (MDM) is the core process used to manage, centralize, organize, categorize, localize, synchronize and enrich master data according to the business rules of the sales, marketing, and operational strategies of a company. MDM employs comprehensive methods to define and manage an organization's critical data. It provides a single, trusted view of data across the components, interactions, and interests of the organization.

Master data includes data and information associated with entities with which the organization serves, supports, or interacts, such as customers, clients, employees, contractors, patients, health care providers, service providers (people), other organizations, locations, products, or objects having distinctive identification attributes.

Data quality and accuracy are important attributes of master data sets, and MDM systems include techniques to avoid false positives and false negatives in resolving two entity records as the same entity.

SUMMARY

Embodiments of the present invention disclose a method, computer program product, and system. The embodiments include a method for resolving entity records of a master data management (MDM) system. The method provides for one or more processors to receive a first score associated with matching between entity records of a plurality of entities of master data of an MDM system. The one or more processors identify the first score of a set of entity records, respectively, that is above a lower threshold matching score and below an upper threshold matching score, indicating an unresolved matching of the set of entity records. The one or more processors generate a second score associated with a relationship between entity records, based on analysis of relationship data associated with the set of entity records. The one or more processors generate an overall score for the set of entity records by combining the first score associated with the matching and the second score associated with the relationship. The one or more processors determine whether the overall score of the set of entities exceeds the upper threshold, and responsive to the overall score of a pair of entity records of the set of entity records exceeding the upper threshold, the one or more processors combining information of the pair of entity records of the set of entity records into a single record, and removing redundant entity records from the MDM system.

DETAILED DESCRIPTION

Figure 1:
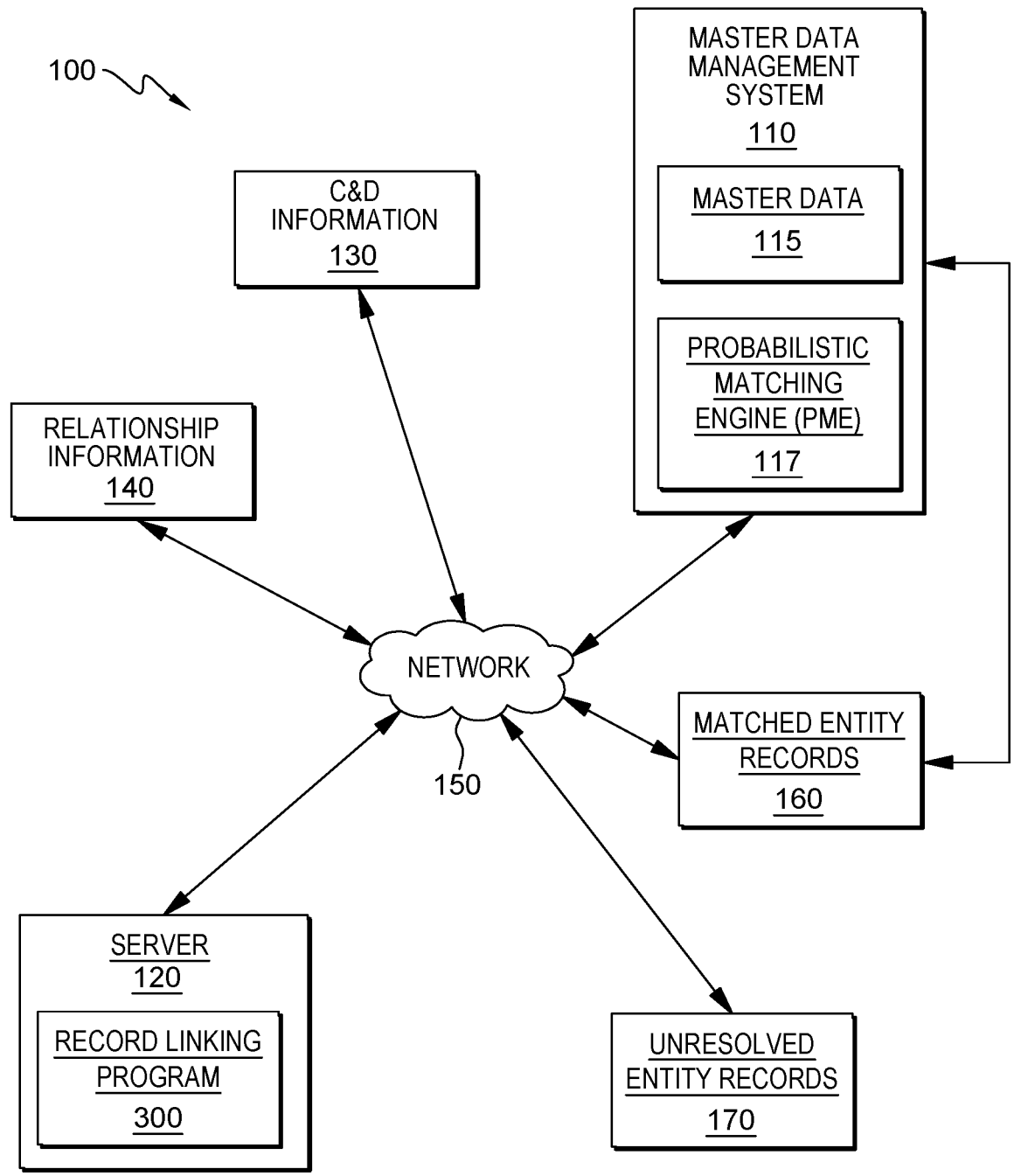
FIG. 1 is a functional block diagram illustrating a distributed data processing environment, in accordance with an embodiment of the present invention.

Embodiments of the present invention recognize that master data management (MDM) systems often utilize a probabilistic matching engine (PME) to assess data records of entities and determine whether data records are duplicates of an entity or whether data records are of distinct entities. Embodiments also recognize that PME solutions create matching scores in pairing each master data record with the other master data records to determine a matching score, based on attributes of the respective entity records. Embodiments recognize that matching algorithms of a PME are carefully calibrated to minimize false positive and false negative matches of entity records, as false matches may lead to highly problematic actions and decisions.

In embodiments of the present invention, the terms "entity" is used to refer to an object, and an "entity record" refers to a collection of data and information associated with the object. An entity may be, for example, a person, family, group of people, a business, an organization, a location area, a product, a service, or any object having attributes or properties providing identification or description by a collection of data and information about the object. Individual people entities may be, for example, customers, patients, contacts, employees, members, and providers. Embodiments also recognize that entity records may include limited, changed, or erroneous data and information of attributes of the entity, creating conditions in which duplicate or redundant entity records may exist within the master data.

Embodiments of the present invention recognize that PME solutions applied to MDM system entity records result in entity record scores. An entity record includes the data and information associated with attributes of the entity which, for example, may include name or label, address, phone number, gender, and other attributes and properties. PME entity record matching generates a probability score by comparing available entity attributes between entity record pairs and scoring higher for matches of attributes, and lower or negative values for non-matching attributes. The total score is applied to a pair of sorting thresholds. The two thresholds demark the limits of automatically determining whether the pair of records are of the same entity (above upper threshold score) or are from distinct entities (below the lower threshold score). The comparison of records in which the PME solution generates a matching score at or above the lower threshold, or at or below the upper threshold, require additional resolution to determine whether the records are of the same entity or not.

Users of master data repositories rely on the high quality and accuracy of the data and often utilize manual review techniques, performed by data stewards, to resolve the distinction of entity records. Embodiments recognize that applying conservative PME solution algorithms to entity records results in a set of unresolved entity records that often require manual review to resolve. In some cases, the unresolved records are ignored, and the inaccurate data is accepted to avoid the cost associated with the manual resolution by clerical review.

Embodiments of the present invention provide a method, computer program product, and computer system to resolve potential duplicate or redundant entity records of master data. In embodiments of the present invention, an assessment is performed of relationship, grouping, and hierarchical record data between pairs of entity records of master data. The assessment generates a relationship score which is added to the matching score of the PME algorithms, resulting in an overall score to more precisely determine whether record pairs are of the same entity or are distinct entities. In some embodiments, the relationship attributes compared between entities include common grouping and hierarchical relationships, such as a reporting structure or functional interaction within a business or organization. Embodiments of the present invention, herein, refer to entity record attributes of relationship as also including attributes of grouping and hierarchy between entities.

Embodiments of the present invention recognize that MDM systems, utilizing PME algorithm solutions, include only categorical and demographic data for entity matching and resolution. Embodiments of the present invention include the addition of relationship data added to the existing categorical and demographic matching data of the MDM system. In some embodiments, a second score is generated reflecting relationship, grouping, and hierarchical information associated with entities of the master data, and the second "relationship" score is combined with the initial "matching score" to result in an overall score for the pairing of entities. The overall score is then compared to the upper and lower thresholds to determine whether the pair of entities are matched, unmatched, or part of a significantly reduced un-resolved category.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes master data management (MDM) system 110, server 120, categorical and demographic (C&D) information 130, relationship information 140, linked entity records 160 and unresolved entity records 170, all interconnected via network 150. Network 150 can be, for example, a local area network (LAN), a wide area network (WAN), such as the Internet, a virtual local area network (VLAN), or any combination that can include wired, wireless, or optical connections. In general, network 150 can be any combination of connections and protocols that will support.

MDM system 110 includes master data 115 and probabilistic matching engine (PME) 117. MDM system 110 receives, stores, processes, and updates master data 115. MDM system 110 may include combinations of computing, processing, storage, editing devices, and application to maintain master data 115. MDM system 110 performs a matching operation via PME 117 in which each entity record is compared to all other entity records of master data 115 to determine whether the records are of the same entity or distinct entities. The matching operation performed by MDM system 110 includes generating a first score, referred to herein as a matching score, based on a probability that attributes of two entity records are of the same entity.

Master data 115 is depicted as a component of MDM system 110. In some embodiments, master data 115 may be contained within a searchable database or repository and may be an integrated part of MDM system 110. In other embodiments, master data 115 is a separate data repository accessible to MDM system 110 (not shown). Master data 115 includes information about attributes of entities of master data 115. In some embodiments, master data 115 includes attributes associated with respective entities of master data 115, such as a name or label, location, subject matter associated with the entity (such as customer, organization, etc.), as well as other categorical and/or demographic data. PME 117 can utilize master data 115 to generate a first score (matching score) between pairs of entity records. In embodiments of the present information, master data 115 includes an additional set of relationship data, such as the information included in relationship information 140, in addition to information and data from categorical and demographic sources, such as C&D information 130.

C&D information 130 includes one or more sources of categorical and demographic entity data and information. In some embodiments, C&D information 130 includes data and information provided by the entity or support service of the entity. In other embodiments, C&D information 130 results from and action or transaction of the entity. Embodiments of the present invention consider data that can be described by a category description (age group, height, location, and descriptive information) as categorical information. Embodiments consider demographic data to include name or label, location, (for people or organization, phone number), identification numbers, etc. C&D information 130 is utilized by PME 117 of MDM system 110 to generate a first score of matching between entities of master data 115.

Relationship information 140 includes one or more sources of information regarding relationships of an entity of master data 115 to other entities, groupings of entities, and hierarchical relationships with other entities. For example, relationship information 140 may include information about a first entity (person) having two siblings; an older brother and younger sister, as well as a parent with the same first name. In another example, relationship information 140 includes information about a recreational organization that a first user is a member of, and a business at which the first user works, as well as the hierarchical position of the first user within the business. Embodiments of the present invention generate a second score utilizing relationship information 140 for each pairing of entities of master data 115, which is combined with the first score, which is the matching score performed by PME 117, to produce an overall score for determining whether a pairing of entity records of master data 115 are the same or distinct.

In various embodiments of the present invention the categorical and demographic entity data and information included in C&D information 130 and the relationship data and information included in relationship information 140 are collected or provided by the entity with options for the entity to "opt-in" or "opt-out." Embodiments of the present invention provide the entity with a description of how the collected or provided information is utilized and enables the entity to authorize or decline the use of the collected or provided information for the stated purposes.

Matched entity records 160 include all records originally categorized as un-resolved entity records subsequent to the first score of matching by PME 117 that have been resolved as matched subsequent to obtaining an overall score by combining the relationship score with the match score. Matched entity records 160 are identified and sent to MDM system 110 to resolve the duplication of entity records and combine the previously separate entity records under the determined single entity. In some embodiments, the data of the pair of entity records are combined, conflicting data verified, and duplicate records are removed from the master data.

Unresolved entity records 170 includes entity records whose overall score, after combining the matched score with the relationship score, remains above the lower threshold score and below the upper threshold score. Unresolved entity records 170 remain unresolved and, in some embodiments, a data steward is assigned to complete resolution of the significantly reduced number of unresolved entity records.

Server 120 is depicted as including record linking program 300. Server 120 communicates with MDM system 110 and forwards the output of unresolved entity records from PME 117 via network 150 to record linking program 300. In some embodiments, server 120 can be a web server, a blade server, a desktop computer, a laptop computer, a tablet computer, a netbook computer, or any other programmable electronic computing device capable of receiving, sending, and processing data, and communicating with MDM system 110, within distributed data processing environment 100 via network 150. In another embodiment, server 120 represents a computing system utilizing clustered computers and components (e.g., database server computers, application server computers, etc.) that act as a single pool of seamless resources when accessed within distributed data processing environment 100. Server 120 may include internal and external hardware components, as depicted in more detail and described in FIG. 4.

Record linking program 300 is depicted as operating on server 120 and communicatively connected to MDM system 110 via network 150. In some embodiments, record linking program 300 may operate within a computer server system that includes MDM system 110 (not shown). Record linking program 300 receives an initial matching score (first score) between pairings of unresolved entity records whose matching score is determined based on categorical and demographic data of master data 115; exclusive of relationship information, such as relationship information 140. Subsequent to identifying a set of unresolved entity records, record linking program 300 determines a relationship between the pairings in which each unresolved entity record is paired with each other unresolved entity record. Record linking program 300 generates a relationship score (second score) based on a type of relationship and includes relationships between the paired entities and with other entity records. Record linking program 300 combines the previously determined matching score, performed by PME 117 of MDM system 110, with the relationship score to produce an overall score.

The lower threshold score and upper threshold score are defined within PME 117 and are used to delineate entity records as unmatched, unresolved, and matched. Record linking program 300 receives the matching scores of the respective pairings of entity records that exceed a lower threshold score but are less than an upper threshold score, corresponding to unresolved entity records. Record linking program 300 generates a second score for each pairing of the respective unresolved entity records, based on relationship data added to master data 115 of MDM system 110 subsequent to initial loading of the plurality of entities and the corresponding categorical and demographic data and information of the plurality of entities.

In some embodiments, the second score is weighted based on relationship data that more definitively indicates the paired entity records are of the same entity (higher positive score) or are of distinct entities (lower or negative score). Record linking program 300 combines the first score and second score for each of the pairings of the respective unresolved entity records to produce an overall score. Record linking program 300 compares the overall score of each pairing of entity records to the upper and lower score thresholds. If the overall score of a pair of entity records exceeds the upper score threshold, then record linking program 300 considers the pair of records as a match and combines or assimilates the information of the two separate records into a single record and removes redundant records and information from master data 115. If the overall score of the pair of entity records under consideration falls below the lower threshold score, then record linking program 300 considers the pair or entity records as unmatched and distinct records. If the overall score of the pair of entity records under consideration falls on or between the lower threshold score and the upper threshold score, then record linking program 300 considers the pair or entity records under consideration as unresolved and require additional investigation, often performed manually by a data steward.

In some embodiments of the present invention, record linking program 300 generates the second score based on relationships between entities, groupings of entities, and hierarchical structure between entities. For example, a person may have sibling, offspring, parental, and/or extended family relationships, and may be a member of an organization with other entities, may reside in an area in common with other entities, may work at a business organization in common with other entities, and may hold a position that has a hierarchical structure as related to other entities. The existence or absence of one or more relationships with another entity of the unresolved entity records may increase, decrease, or have no effect on the second score of a pairing of respective unresolved entity records, based on predetermined weights given for certain conditions of a relationship.

In another example embodiment, if two entity records indicate having a single sibling, and each entity record includes a parent relationship common to both entity records, then the two entities are most likely distinct and the relationship weights would be lower and likely negative in value towards the second score, such that the overall score falls below the lower threshold score, indicating the entity records are unmatched. If two entities have a common organization membership and a common name of a spouse, the two entity records are most likely the same entity, and the scoring for the relationships would be positive and higher, matching the two entity records.

In some embodiments of the present invention, record linking program 300 is a machine learning model to which unresolved entity records are applied subsequent to an initial matching scoring. In some embodiments, the machine learning model is trained by determining weighting factors corresponding to relationship types, hierarchy conditions, and common grouping attributes of a respective pair of unresolved entity records of master data that have been manually resolved by a data steward, and thus serves as supervised training of the machine learning model. Subsequent to the deployment of record linking program 300 as a machine learning model, record linking program 300 obtains results from the reduced but remaining unresolved entity records that are resolved by a data steward, thus continually improving the machine learning model.

Figures 2A, 2B:
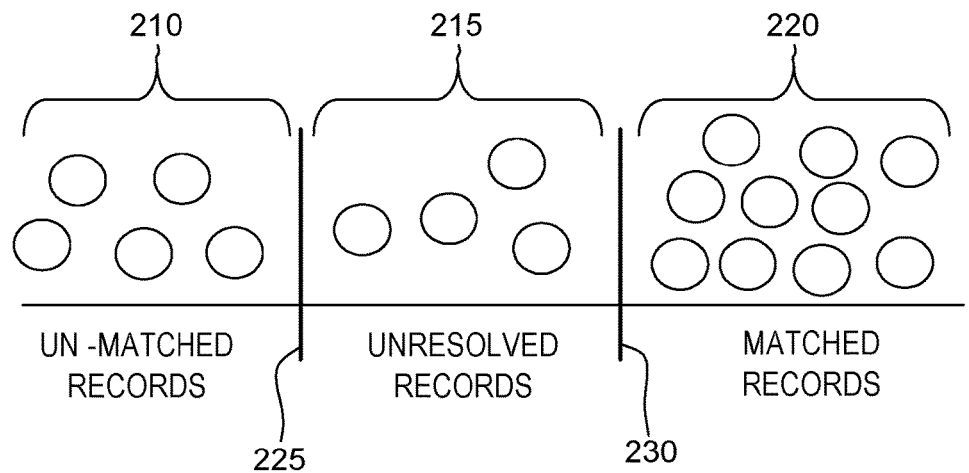
FIG. 2A illustrates a categorization of entity record probabilistic matching, in accordance with embodiments of the present invention.
FIG. 2B illustrates an example of weighted scoring of entity-relationship types, in accordance with embodiments of the present invention.

FIG. 2A illustrates a categorization of entity record probabilistic matching, in accordance with embodiments of the present invention. FIG. 2A includes un-matched records 210, unresolved records 215, matched records 220, lower threshold score 225, and upper threshold score 230. In embodiments of the present invention, subsequent to a first score between pairings of entity records of master data, entity records are categorized into three conditions of entity record matching. The first score of entity record pairs is performed by PME 117 (FIG. 1). The categorization of entity records of the master data is based on the first score of each entity record pairing with each other entity records, sometimes referred to as the two entity records under review. Lower threshold score 225 and upper threshold score 230 are defined by MDM system 110 and are aligned with the scoring scheme and conservative objectives of MDM system 110 to avoid false negatives and false positives, which typically results in significant entity records categorized in unresolved records 215.

PME 117, operating on master data management system 110, performs entity record comparisons to determine a first score. PME 117 compares an entity record to another entity record and is given a score based on whether attributes of the entity record match or nearly match, such that a match of attributes increases the first score, while a lack of matching has no effect or decreases the first score. PME 117 performs the comparisons iteratively for combinations of the plurality of entity records. PME 117 compares the first score to lower threshold score 225 and upper threshold score 230 to determine the categorization of the entity record pair. If PME 117 determines that the first score of an entity record falls below lower threshold score 225, then PME 117 categorizes the entity record in un-matched records 210. If PME 117 determines that the first score exceeds upper threshold score 230, then PME 117 categorizes the entity record pair in matched records 220, and if the first score is at or between lower threshold score 225 and upper threshold score 230, then PME 117 categorizes the entity record pair in unresolved records 215.

FIG. 2B illustrates a table including example weighted scoring of entity-relationship types, in accordance with embodiments of the present invention. FIG. 2B includes sibling relationship type 240, parent relationship type 242, spouse relationship type 244, and employer relationship type 246 as respective columns of relationship scoring table 270. Relationship scoring table 270 includes row 250, which includes relationship scoring (second score) examples of two entity records of unresolved master data under review in the format of "a, b," in which "a" is a weight for the relationship between the two entity records under review, and "b" is a weight for no relationship. FIG. 2B includes row 260, which represents scoring examples of a relationship of the two entity records under review in the format of "x, y, z", in which "x" is the weight value of a relationship of the pair of entity records with another common entity, "y" is the weight value of a relationship of the pair of entity records with different other entities, and "z" is a weight value indicating no relationship with other entities.

Row 250 and sibling relationship type 240 depict a weight of a relationship score for a sibling relationship between the pair of entity records under review and, therefore, a large negative weight is assigned (position "a") because it is unlikely that the two entity records are distinct. The weight indicating no relationship "b" is maintained at a zero value as the entity records of the pair under review confirm a sibling relationship.

Row 250 and parent relationship type 242 depict an example weight for a relationship score for a parent-child relationship between the pair of entity records, and row 250 and spouse relationship type 244 depict an example weight for a relationship score for the two entity records having a spouse-spouse relationship. If the two entity records under review include a parent or spouse relationship, then the entity records are most likely not the same entities and are assigned large negative weights to the relationship score (second score) to influence the overall score below the lower threshold score. Row 250 and employer relationship type 246 depict a relationship between the pair of entity records as having a common employer. The weight assigned to the relationship score example is zero, having no weighted influence on the relationship score, as it is somewhat likely that distinct entities could be working for the same employer.

Row 260 indicates example weights for the second score (relationship score) based on the sibling, parent, spouse, and employer relationships. Row 260 and sibling relationship type 240 depict a common sibling relationship of the pair of entity records with another entity (position "x") and receive a lower weight of ten because the two records could be of the same entity or there could be a third sibling related to both. Row 260 and parent relationship type 242 depict a common parent relationship of the pair of entity records with another entity (position "y") and receives a weight of fifteen, because the pair of records may be of the same entity, or they may be siblings. Row 260 and spouse relationship type 244 depict a common spouse relationship and receives a higher weight of 50 because the pair of entity records is most certainly the same entity. Row 260 and employer relationship type 246 depicts example weights for the second score based on a relationship of the entity records under review and an employer.

The example weights of FIGS. 2A and 2B are meant to reflect the relationship considerations in determining whether paired entity records are likely the same entity and result in the records as a match, or that the entity records are distinct. The magnitudes of the weights are examples, and implementations of embodiments of the present invention include consideration of the management of the particular master data.

Figure 3:
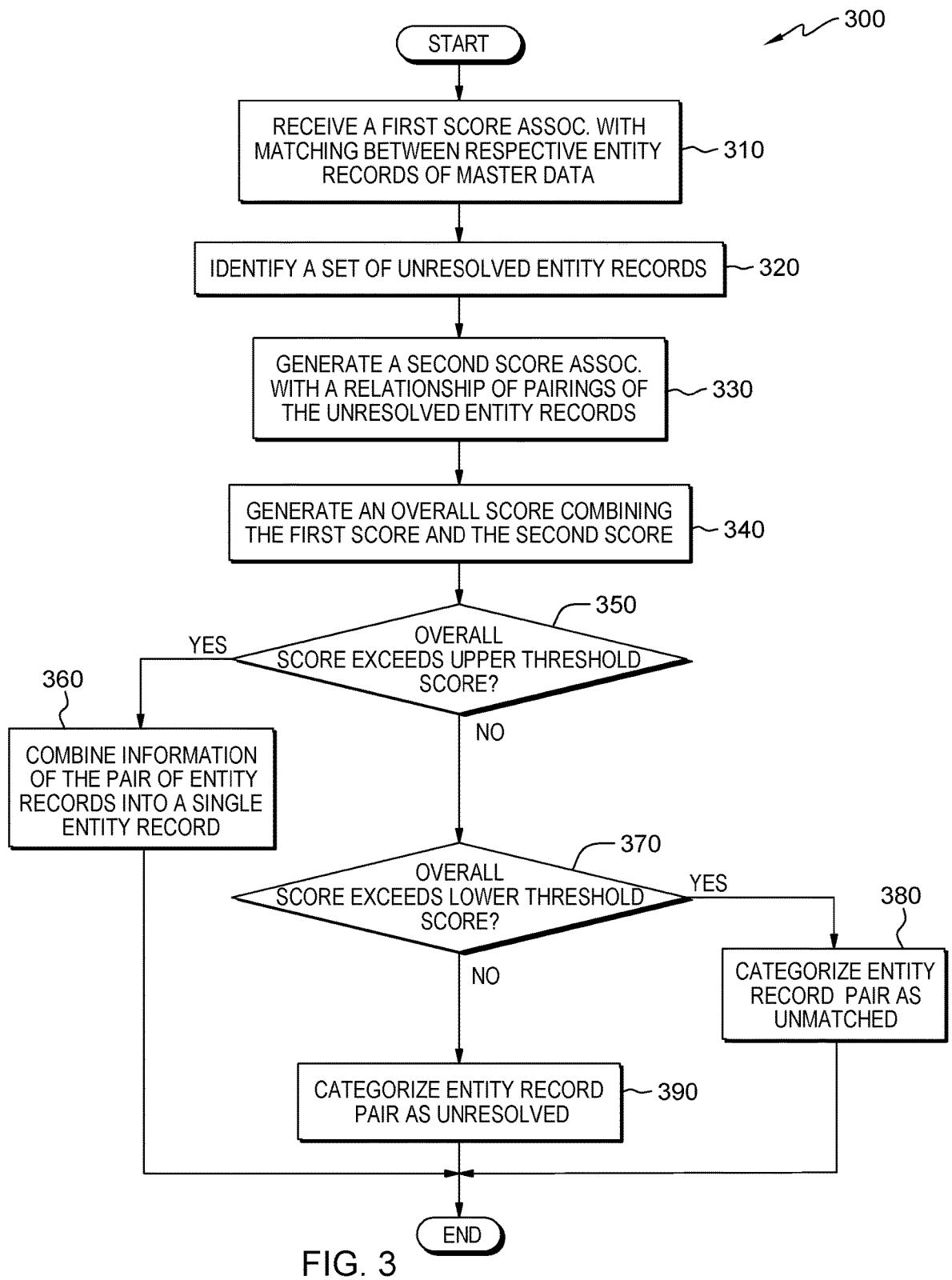
FIG. 3 is a flowchart depicting operational steps of a record linking program operating in the distributed data processing environment of FIG. 1, in accordance with embodiments of the present invention.

FIG. 3 is a flowchart depicting operational steps of record linking program 300 operating in the distributed data processing environment of FIG. 1, in accordance with embodiments of the present invention.

Record linking program 300 receives a first score associated with matching between respective entity records of master data (step 310). In some embodiments of the present invention, entity records of master data, having common or similar attributes, are paired and scored (first score) by a probabilistic matching engine to determine whether the pair of entity records are from the same entity, from distinct entities, or are unclear as to whether the entity records are from the same or different entities, which are considered unresolved.

For example, a pair of entity records of master data having the same last name attribute is processed by probabilistic matching engine 117 of MDM system 110 and results in a first score of matching between the pair of entity records.

Record linking program 300 identifies a set of unresolved entity records (step 320). In embodiments of the present invention, record linking program 300 receives the entity records categorized as "unresolved" subsequent to a first score matching entity record pairs that were not considered as a match of records or distinct records. In some embodiments, an upper threshold score and a lower threshold score are established, and a probabilistic matching engine applies the threshold scores to determine matched and unmatched entity record pairs. The upper threshold score and lower threshold score are conservatively determined to avoid false positive and false negative matching of entity records. The conservative thresholds result in significant quantities of entity records that are categorized as "unresolved" subsequent to an initial matching score determination. Record linking program 300 determines the unresolved entity records as a set for additional matching resolution.

For example, a plurality of data and information records of master data 115, corresponding to a plurality of entities, are processed by PME 117 of MDM system 110. PME 117 generates a probability score of record matching (first score) for pairs of entity records and categorizes the records as "matched", based on the matching score of a pair of entity records exceeding an upper threshold score. PME 117 can categorize [airs of entity records as "unmatched", based on the matching score falling below a lower threshold score, and the pairs of entity records with initial matching scores on or between the lower threshold score and upper threshold score are categorized as "unresolved". Record linking program 300 identifies the entity records with initial matching scores on or between the lower threshold score and upper threshold score as a set of unresolved entity records.

Record linking program 300 generates a second score associated with a relationship of pairings of the unresolved entity records (step 330). Master data management (MDM) systems consider basic categorical and identifying information for entity record resolution, such as name, address/location, phone number, accounts, dates, etc. In embodiments of the present invention, MDM systems include qualified relationship information, which is used to generate a second score associated with the relationships between entity records and between a pair of entity records and other entity records of the master data. Embodiments of the present invention include known and qualified information associated with hierarchy and groupings of entities as indicated within the entity records of the master data, in relationship scores.

Record linking program 300 applies weighting to the matching score of a pair of unresolved entity records. In some embodiments, a positive weighting is applied for relationship, hierarchy, and grouping information that supports the entity records to likely be from the same entity and are likely to be a match. In some embodiments, relationship information may strongly support a matched set of entity records, and the weighting is therefore significantly higher. In other embodiments, the relationship information indicates that the records are most likely from distinct entities and are assigned zero or a negative weight value. In some embodiments, record link program 300 considers relationship, hierarchy, and grouping information, collectively referred to herein as "relationship information", of a pair of unresolved entity records under review, with one or more other entity records in determining the relationship score (second score).

For example, record linking program 300 determines that each entity record a pair of entity records are linked to different employers and have relationships with different spouses. Record linking program 300 applies a large negative weight (e.g. −100) for the pairing of records as the records are distinct. Another pair of entity records have a sibling relationship with a common entity and have a common parent relationship. Record linking program 300 assigns a positive weight of ten to the records as the records are likely from the same entity, however, there could be a third sibling that the two entities of the entity records are related to, so the assigned weight is somewhat smaller in value. In some embodiments, the relationship information can be indexed or bucketed based on "entity-from-id", "entity-to-id", and "relationship type" for faster relationship determination and selection.

Record linking program 300 generates an overall score by combining the first score and the second score (step 340). Record linking program 300 combines the first score, generated by an initial probability matching engine with the second score generated from relationship information to generate the overall score for the pair of unresolved entity records under review. In some embodiments, the overall score is an arithmetic sum of the matching score and the relationship score. In other embodiments, the relationship score may include a positive or negative factor multiplied with the first score matching result, such as a factor of −1.25 which would reduce the first score by 25%.

Record linking program 300 determines whether the overall score matching pairs of entity records exceeds an upper threshold score (decision step 350). Record linking program 300 compares the overall matching score of the pair of entity records to the upper threshold score previously established to determine whether the overall score exceeds the upper threshold. In some embodiments of the present invention, the relationship score increases the overall matching score of the pair of entity records above the upper threshold score, whereas in other embodiments, the relationship score is significantly negative, and the overall matching score falls below the lower threshold score.

For the case in which the overall score does not exceed the upper threshold score (step 350, "NO" branch), record linking program 300 proceeds to determine whether the overall score falls below the lower threshold score (decision step 370). Record linking program 300, in step 370, compares the overall score matching the pair of unresolved entity records against the lower threshold score and determines whether the overall score falls below the lower threshold score.

For the case in which the overall score falls below the lower threshold score (step 370, "YES" branch), record linking program 300 categorizes the pair of entity records as "unmatched" (step 380). Having determined that the overall score matching the pair of unresolved entity records falls below the lower threshold score, record linking program 300 categorizes the pair of entity records as "unmatched" concluding that the records are from distinct entities.

For the case in which the overall score is at or above the lower threshold score, but having been determined in previous step 350 that the overall score was at or below the upper threshold score (step 370, "NO" branch), record linking program 300 categorizes the pair of entity records to remain as "unresolved" (step 390), and the resolution of the remaining unresolved entity records from the overall score require additional investigation to resolve. Having compared the overall score of the entity record pair and determining the matching category of the entity records, record linking program 300 ends.

Returning to step 350 and considering the case in which record linking program 300 determines that the overall score does exceed the upper threshold score (step 350, "YES"

branch), record linking program 300 combines the information of each of the pair of entity records into a single entity record (step 360). Record linking program 300 combines information from the entity records under review into a single record and removes redundant information and the duplicate record from the master data.

For example, record linking program 300 determines that a phone number and address of the more recent entity record replace the phone number and address of the older entity record. Record linking program 300 adds new information regarding group membership and date of birth of the entity, found in the more recent entity record, be added to the updated entity record, and discards the duplicate record attributes and entity record, leaving a single record for the entity with combined and updated record attributes.

In some embodiments, the additional resolution of the unresolved entity records is performed manually by data stewards. In embodiments of the present invention, including a second scoring based on known and qualified relationship information of the entities whose entity records are under review greatly reduces the quantity of entity records remaining as "unresolved", significantly reducing time and cost of manual resolution by data stewards and avoiding the loss of accuracy and quality of master data records by ignoring the unresolved entity records.

Figure 4:
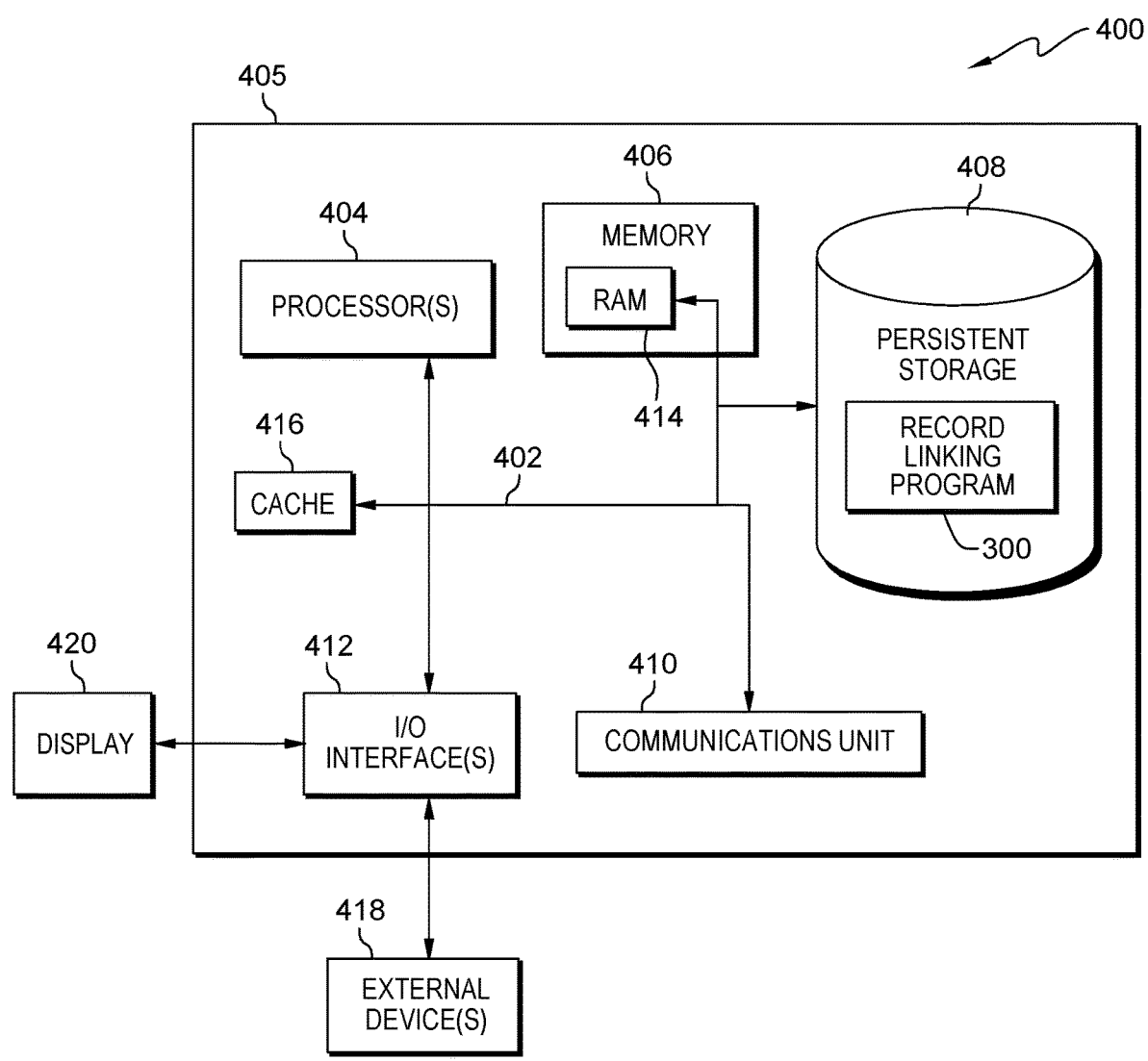
FIG. 4 depicts a block diagram of components of a computing system, including a computing device configured to operationally perform the record linking program of FIG. 3, in accordance with an embodiment of the present invention.

FIG. 4 depicts a block diagram of components of a computing system, including computing device 405, configured to include or operationally connect to components depicted in FIG. 1, and with the capability to operationally perform record linking program 300 of FIG. 3, in accordance with an embodiment of the present invention.

Computing device 405 includes components and functional capability similar to components of server 120, (FIG. 1), in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, an input/output (I/O) interface(s) 412. Communications fabric 402 can be implemented with any architecture designed for passing data and/or control information between processors (such as microprocessors, communications, and network processors, etc.), system memory, peripheral devices, and any other hardware components within a system. For example, communications fabric 402 can be implemented with one or more buses.

Memory 406, cache memory 416, and persistent storage 408 are computer-readable storage media. In this embodiment, memory 406 includes random access memory (RAM) 414. In general, memory 406 can include any suitable volatile or non-volatile computer-readable storage media.

In one embodiment, record linking program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Record linking program 300 may be downloaded to persistent storage 308 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., record linking program 300 can be stored on such portable computer-readable storage media and can be loaded onto persistent storage 408 via I/O interface(s) 412. I/O interface(s) 412 also connects to a display 420.

Display 420 provides a mechanism to display data to a user and may, for example, be a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for resolving entity records of a master data management (MDM) system, the method comprising:
receiving, by one or more processors, a first score associated with matching attributes between respective pairings of entity records of a plurality of entities of master data of an MDM system, wherein the first score is based on categorical and demographic entity data;
identifying, by the one or more processors, a set of unresolved entity records, wherein the first score between the pairings of respective entity records of the set of unresolved entity records is above a lower threshold score and below an upper threshold score;
generating, by the one or more processors, a second score associated with relationship attributes between the pairings of the respective entity records of the set of unresolved entity records, wherein the second score is based on relationships, common groupings, and hierarchical structure between the pairings of the respective entity records and with other entity records which are included in the master data of the MDM system;
generating, by the one or more processors, an overall score by combining the first score and the second score for the pairings of the respective entity records of the set of unresolved entity records;
determining, by the one or more processors, whether the overall score associated with the pairings of the respective entity records of the set of unresolved entity records exceeds the upper threshold; and
responsive to the overall score of a pair of entity records of the set of unresolved entity records exceeding the upper threshold, combining, by the one or more processors, information of the pair of entity records of the set of unresolved entity records into a single entity record.

2. The method of claim 1, wherein the first score is generated exclusive of relationship information, hierarchy information, and grouping information of the respective entity records of the plurality of entities of the master data of the MDM system.

3. The method of claim 1, wherein the second score is based on additional information of relationship, grouping, and hierarchy information associated with entities of the MDM system.

4. The method of claim 1, further comprising:
performing, by the one or more processors, a matching assessment of a first entity of the plurality of entities of the MDM system with a second entity of the plurality of entities, for each entity of the plurality of entities; and
generating, by the one or more processors, the first score associated with matching of the first entity of the plurality of entities with the second entity of the plurality of entities.

5. The method of claim 1, wherein the second score is based on qualified data of relationship information, hierarchy information, and grouping information associated with the pairings of the unresolved entity records, respectively, and includes weighting factors for a determination of a relationship of the pairings of the unresolved entity records, respectively, with a third entity, and weighting factors for a determination of no relationship.

6. The method of claim 1, further comprising:
removing, by the one or more processors, redundant entity records from the master data of the MDM system in response to combining information of the pairings of the respective entity records of the set of unresolved entity records into the single entity record.

7. The method of claim 1, further comprising:
creating, by the one or more processors, a machine learning model that generates the second score associated with the relationship between the pairings of the set of unresolved entity records, respectively, based on the relationship data of the plurality of entities;
receiving, by the one or more processors, second scores and weighting factors corresponding to relationship types, hierarchy conditions and common grouping attributes of the set of unresolved entity records;
training, by the one or more processors, the machine learning model by applying the second scores and the weighting factors corresponding to the relationship types, hierarchy conditions and common grouping attributes of the set of unresolved entity records as supervised learning; and
applying, by the one or more processors, the machine learning model, trained by the second scores and the weighting factors of the set of unresolved entity records, to a new set of unresolved entity records.

8. A computer program product for resolving entity records of a master data management (MDM) system, the computer system comprising:
one or more computer-readable storage media;
program instructions stored on the one or more computer-readable storage media, the program instructions comprising:
program instructions to receive a first score associated with matching attributes between respective pairings of entity records of a plurality of entities of master data of an MDM system, wherein the first score is based on categorical and demographic entity data;
program instructions to identify a set of unresolved entity records, wherein the first score between the pairings of respective entity records of the set of unresolved entity records is above a lower threshold score and below an upper threshold score;
program instructions to generate a second score associated with relationship attributes between the pairings of the respective entity records of the set of unresolved entity records, wherein the second score is based on relationships, common groupings, and hierarchical structure between the pairings of the respective entity records and with other entity records which are included in the master data of the MDM system;
program instructions to generate an overall score by combining the first score and the second score for the pairings of entity records for the respective entity records of the set of unresolved entity records;
program instructions to determine whether the overall score associated with the pairings of the respective entity records of the set of unresolved entity records exceeds the upper threshold; and
responsive to the overall score of a pair of entity records of the set of unresolved entity records exceeding the upper threshold, program instructions to combine information of the pair of entity records of the set of unresolved entity records into a single entity record.

9. The computer program product of claim 8, wherein the first score is generated exclusive of relationship information, hierarchy information, and grouping information of the respective entity records of the plurality of entities of the master data of the MDM system.

10. The computer program product of claim 8, wherein the second score is based on additional information of relationship, grouping, and hierarchy information associated with entities of the MDM system.

11. The computer program product of claim 8, further comprising:
program instructions to perform a matching assessment of a first entity of the plurality of entities of the MDM system with a second entity of the plurality of entities, for each entity of the plurality of entities; and
program instructions to generate the first score associated with matching of the first entity of the plurality of entities with the second entity of the plurality of entities.

12. The computer program product of claim 8, wherein the second score is based on relationship information, hierarchical information, and grouping information associated with the pairings of the unresolved entity records, respectively, and includes weighting factors for a determination of a relationship of the pairings of the unresolved entity records, respectively, with a third entity, and weighting factors for a determination of no relationship.

13. The computer program product of claim 8, further comprising:
program instructions to remove redundant entity records from the master data of the MDM system in response to combining information of the pairings of the respective entity records of the set of unresolved entity records into the single entity record.

14. The computer program product of claim 8, further comprising:
- program instructions to create machine learning model that generates the second score associated with the relationship between the pairings of the set of unresolved entity records, respectively, based on the relationship data of the plurality of entities;
- program instructions to receive second scores and weighting factors corresponding to relationship types, hierarchy conditions and common grouping attributes of the set of unresolved entity records;
- program instructions to train the machine learning model by applying the second scores and the weighting factors corresponding to the relationship types, hierarchy conditions and common grouping attributes of the set of unresolved entity as supervised learning; and
- program instructions to apply the machine learning model, trained by the second scores and the weighting factors of the set of unresolved entity records, to a new set of unresolved entity records.

15. A computer system for resolving entity records of a master data management (MDM) system, the computer system comprising:
- one or more computer processors;
- one or more computer-readable storage media;
- program instructions stored on the one or more computer-readable storage media, the program instructions comprising:
  - program instructions to receive a first score associated with matching attributes between respective pairings of entity records of a plurality of entities of master data of an MDM system, wherein the first score is based on categorical and demographic entity data;
  - program instructions to identify a set of unresolved entity records, wherein the first score between the pairings of respective entity records of the set of unresolved entity records is above a lower threshold score and below an upper threshold score;
  - program instructions to generate a second score associated with relationship attributes between the pairings of the respective entity records of the set of unresolved entity records, wherein the second score is based on relationships, common groupings, and hierarchical structure between the pairings of the respective entity records and with other entity records which are included in the master data of the MDM system;
  - program instructions to generate an overall score by combining the first score and the second score for the pairings of entity records for the respective entity records of the set of unresolved entity records;
  - program instructions to determine whether the overall score associated with the pairings of the respective entity records of the set of unresolved entity records exceeds the upper threshold; and
  - responsive to the overall score of a pair of entity records of the set of unresolved entity records exceeding the upper threshold, combining, by the one or more processors, information of the pair of entity records of the set of unresolved entity records into a single entity record.

16. The computer system of claim 15, wherein the first score is generated exclusive of relationship information, hierarchy information, and grouping information of the entity records and the second score is based on additional relationship information, hierarchy information, and grouping information associated with the respective entity records of the plurality of entities of the master data of the MDM system.

17. The computer system of claim 15, further comprising:
- program instructions to perform a matching assessment of a first entity of the plurality of entities of the MDM system with a second entity of the plurality of entities, for each entity of the plurality of entities; and
- program instructions to generate the first score associated with matching of the first entity of the plurality of entities with the second entity of the plurality of entities.

18. The computer system of claim 15, wherein the second score is based on relationship information, hierarchical information, and grouping information associated with the pairings of the unresolved entity records, respectively, and includes weighting factors for a determination of a relationship of the pairings of the unresolved entity records, respectively, with a third entity, and weighting factors for a determination of no relationship.

19. The computer system of claim 15, further comprising:
- program instructions to remove redundant entity records from the master data of the MDM system in response to combining information of the pairings of the respective entity records of the set of unresolved entity records into the single entity record.

20. The computer system of claim 15, further comprising:
- program instructions to create machine learning model that generates the second score associated with the relationship between the pairings of the set of unresolved entity records, respectively, based on the relationship data of the plurality of entities;
- program instructions to receive second scores and weighting factors corresponding to relationship types, hierarchy conditions, and common grouping attributes of the set of unresolved entity records;
- program instructions to train the machine learning model by applying the second scores and the weighting factors corresponding to the relationship types, the hierarchy conditions and the common grouping attributes of the set of unresolved entity records as supervised learning; and
- program instructions to apply the machine learning model, trained by the second scores and the weighting factors of the set of unresolved entity records, to a new set of unresolved entity records.

* * * * *